United States Patent [19]

Tisue

[11] Patent Number: 4,556,910
[45] Date of Patent: Dec. 3, 1985

[54] IMAGE SENSING DEVICE HAVING ON-CHIP FIXED-PATTERN NOISE REDUCING CIRCUIT

[75] Inventor: Gil Tisue, Los Altos, Calif.

[73] Assignee: Fuji Photo Film Co., Ltd., Kanagawa, Japan

[21] Appl. No.: 568,319

[22] Filed: Jan. 5, 1984

[51] Int. Cl.[4] .............................................. H04N 3/15
[52] U.S. Cl. .................................... 358/212; 358/213; 358/167; 358/211
[58] Field of Search ............... 358/211, 212, 213, 217, 358/184, 167, 222; 250/578

[56] References Cited

U.S. PATENT DOCUMENTS 4,011,442  3/1977  Engeler ................................ 235/193
4,335,406  6/1982  Ohba et al. ........................... 358/213

Primary Examiner—Thomas W. Brown
Assistant Examiner—Robert G. Lev
Attorney, Agent, or Firm—Sughrue, Mion, Zinn, Macpeak & Seas

[57] ABSTRACT

An image sensing device having an on-chip output signal extracting circuit employing low gain-bandwidth product amplifiers and a simple circuit design. The output signal from scanning a photosensor element array is applied to the inverting input of an operational amplifier, the noninverting input of which receives a reference potential. A feedback capacitor is connected between the output and inverting input of the operational amplifier, and a resetting FET is connected in parallel with the feedback capacitor. An inverted replica of switching transients which occur on the inverting input terminal of the amplifier is fed to that terminal via a second capacitor. The output of the operational amplifier is buffered and applied to the output terminal of the sensor chip.

6 Claims, 9 Drawing Figures

PART OF SENSOR ARRAY CHIP 15

PART OF SENSOR ARRAY CHIP

IMAGE SENSING DEVICE HAVING ON-CHIP FIXED-PATTERN NOISE REDUCING CIRCUIT

BACKGROUND OF THE INVENTION

The invention pertains to a solid-state image sensing device including a fixed-pattern noise reducing circuit.

FIG. 1 is a diagram illustrating a prior art image sensing device of the same general type to which the invention pertains. The device includes a sensor array chip 15 upon which are fabricated a pixel (picture element) array 12, vertical and horizontal shift registers 11 and 13, and output switches comprising FETs 19. The pixel array 12 includes vertical lines 18 and horizontal lines 20 arranged perpendicular to one another. (Although the vertical lines 18 extend in the horizontal direction in the figure and the horizontal lines 20 in the vertical direction, nevertheless, they are properly termed vertical and horizontal lines, respectively, since the vertical lines 18 are scanned in the vertical direction and the horizontal lines 20 scanned in the horizontal direction.) Light-sensing pixels 14 are formed at each intersection between a vertical line 18 and horizontal line 20. Each pixel schematically is composed of an FET switch 17 and a photosensitive diode 16.

The horizontal lines 20 are connected to the sources of respective output switch FETs 19, the drains of which are connected in common to a line 37. The gates of the FETs are connected to respective outputs of the horizontal shift register 13. The line 37 is connected to a video output terminal pad 23. The terminal pad 23 is coupled externally of the chip 15 to the inverting input of an operational amplifier 41, the noninverting input of which is connected to a source of a reference potential $V_{REF}$. Alternatively, the video output can be summed with a reference potential and the sum applied to the inverting input of the amplifier 41. A feedback resistor 42 is connected between the output of the amplifier 41 and the inverting input. The output of the amplifier 41 is also applied to a fixed-pattern noise integrator circuit 43.

In operation, the vertical shift register is operated by clocking signals $\phi_{V1}$ and $\phi_{V2}$ to activate the lines 18 in sequence. Activation of each of the lines 18 in this manner causes the FETs 17 having gates connected to that line to turn on, thereby transferring signal charges, the magnitudes of which are indicative of the sensed light intensity, from the respective photosensitive diodes 16 to the horizontal lines 20. After the signal charges have been transferred, the horizontal shift register 13 is operated by clocking signals $\phi_{H1}$ and $\phi_{H2}$ to turn on the FETs 19 in sequence, thereby to transfer the signal charges from the horizontal lines 20 one at a time to the line 37, and thence via the terminal pad 23 to the inverting input of the amplifier 41.

Referring now to the waveform diagrams of FIGS. 2A through 2F, the operation of the abovedescribed device will be further explained. FIGS. 2A and 2B show two pulses from adjacent outputs of the horizontal shift register 13. In response to the pulses of FIGS. 2A and 2B, signal charges, as illustrated by the current signals shown in FIGS. 2C and 2D, from corresponding horizontal lines 20 are transferred via respective FETs 19 to the output line 37. However, the pulses of FIGS. 2C and 2D do not appear in this form on the output line 37. Instead, due to the presence of stray capacitances 31 through 36, the current signal on the output line 37 actually appears as shown in FIG. 2E because of switching transients and induced noise. In fact, as can readily be appreciated from comparing FIGS. 2C and 2D with FIG. 2E, the switching transients and noise components are much greater in magnitude than the actual signal components. The actual signal components show up in the waveform of FIGS. 2E as only a slight drooping in the waveform, as indicated by the difference between the dashed line and adjacent solid-line portions of the indicated waveform. The peak amplitudes of the waveform of FIG. 2E carry little information regarding the signal amplitude. Moreover, the peaks of the waveform FIG. 2E vary from pulse to pulse, thereby resulting in what is known as fixed-pattern noise. The subject of fixed-pattern noise is discussed in more detail in the articles: Nabeyama et al., "All Solid-State Color Camera with Single Chip MOS Imager", *IEEE Transactions on Consumer Electronics*, Vol. CE-27, February 1981; Imada et al., "Noise of an MOS-type Area Imager", 1982 Conference on Custom Integrated Circuits, Rochester, N.Y.; Aoki et al., "$\frac{2}{3}$ Inch Format MOS Single Chip Color Imager", *IEEE Transactions on Electron Devices*, Vol. 29, No. 4, April 1982; and Hodges et al., "Potential of MOS Technologies for Analog Integrated Circuits", *IEEE Journal of Solid State Circuits*, Vol. SC-13, June 1971, pp. 285–294.

To extract the signal component from the signal of FIG. 2E and to eliminate the fixed-pattern noise, the signal from the output terminal pad 23 is buffered and amplified by the amplifier 41, which converts the current signal to a voltage signal, and then integrated by the fixed-pattern noise integrator 43. As indicated in FIG. 2F, the integrator 43 integrates the amplified signal starting from a time $t_0$ at the rising edge of a pulse from the horizontal shift register 13 and stops the integration at a time $t_1$ after all switching transients have died out. Between the time $t_1$ and a subsequent time $t_2$, the output from the integrator 43 is read by a subsequent processing circuit (not shown), after which the integrator 43 is reset (with a signal RESET) between times $t_2$ and $t_3$ to prepare for the next pulse.

The arrangement of FIG. 1 suffers from the following difficulties: First, the amplifier 41 must have a gain-bandwidth product (GBW) of about 400 to 600 MHz for ordinary video rates to avoid signal distortion which would prevent accurate signal integration. Also, the feedback resistor 42 must have a resistance value in excess of 100 k$\Omega$ to produce a usable signal strength. This high resistance value makes the resistor 42 prone to parasitic effects at high frequencies. Still further, the magnitude of the stray capacitance 36 is many times larger than the internal chip capacitance, thereby increasing the random noise. Finally, the large gain-bandwidth product of the amplifier 41 makes the construction of this amplifier unavoidably complex, making it large in size, and further increasing the magnitude of the stray capacitance 36.

To reduce the magnitude of the stray capacitance 36, it is possible to move the amplifier 41, feedback resistor 42 and fixed-pattern noise integrator 43 onto the sensor array chip 15. However, doing so is accompanied by other problems. Specifically, the gain-bandwidth product which can be achieved using current MOS integrated circuit techniques is only about 10 to 20 MHz. Also, it is difficult to fabricate the high resistance value feedback resistor and to make the resistance value sufficiently accurate.

Accordingly, it is an object of the present invention to provide an image sensing device which avoids the specific drawbacks of the prior art approaches mentioned above.

SUMMARY OF THE INVENTION

This, as well as other objects of the invention, are met by an image sensing device including an array of photosensing elements, means for sequentially coupling outputs of the photosensing elements to an array output terminal, and an output signal extracting circuit including an operational amplifier having an input connected to the array output terminal and a resettable feedback capacitor connected directly between the input and output of the amplifier. More specifically, the output signal extracting circuit includes an operational amplifier having a noninverting input coupled to a reference potential source and an inverting input coupled to the array output terminal. The feedback capacitor is coupled between the output of the operational amplifier and the inverting input. An FET transistor, provided to reset the feedback capacitor, has a channel coupled in parallel with the feedback capacitor and a gate coupled to a source of a reset signal. A second capacitor is coupled between the inverting input and a source of a signal having a waveshape similar to, but a polarity opposite from, a non-information-bearing component of the signal on the array output terminal. All of the above components are preferably fabricated upon a single semiconductor chip. Further, a buffer amplifier is provided on the chip for isolating the operational amplifier from the output pin and stray capacitance. For the source of the signal having a waveshape similar to but polarity opposite from the non-information-bearing component of the signal on the array output terminal, a source of the reset signal inverted may be employed. Otherwise, a resistive summing network receiving as inputs the the inverted reset signal and inverted clocking signals may be used.

DESCRIPTION OF THE PREFERRED EMBODIMENTS

Figure 1:
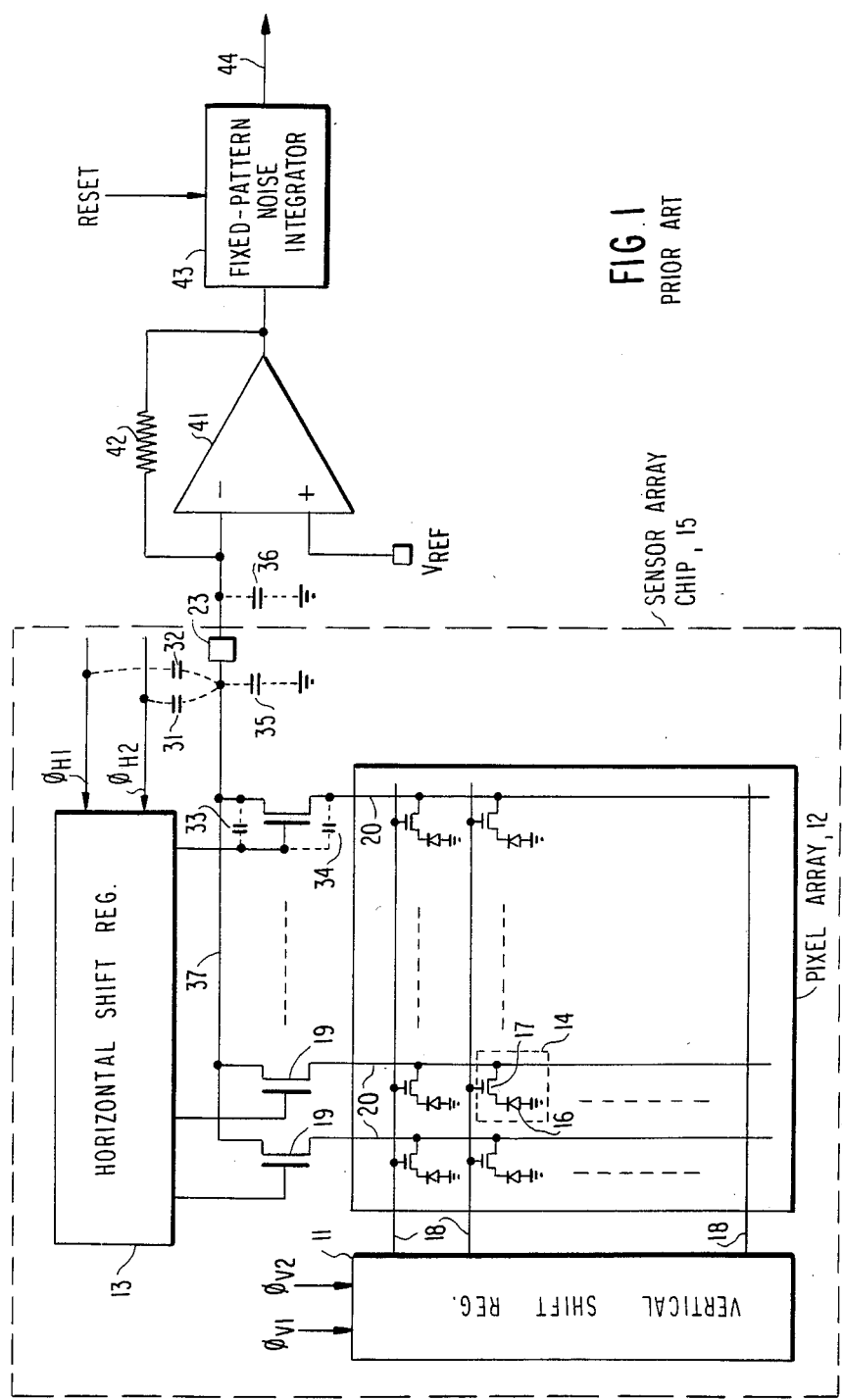
FIG. 1 is a diagram showing a prior art image sensing device of the same general type to which the invention pertains.
Figure 2A:
FIGS. 2A through 2F are waveform diagrams utilized to explain the operation of the circuitry of FIG. 1.
Figure 2B:
Figure 2C:
Figure 2D:
Figure 2E:
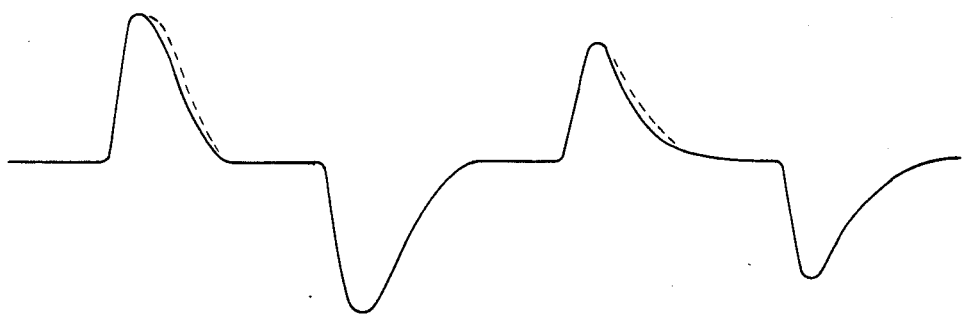
Figure 2F:
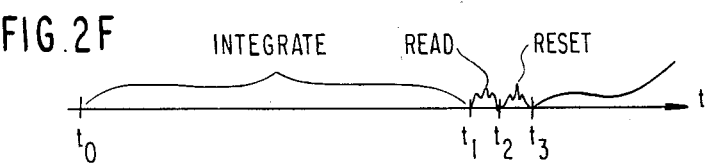
Figure 3:
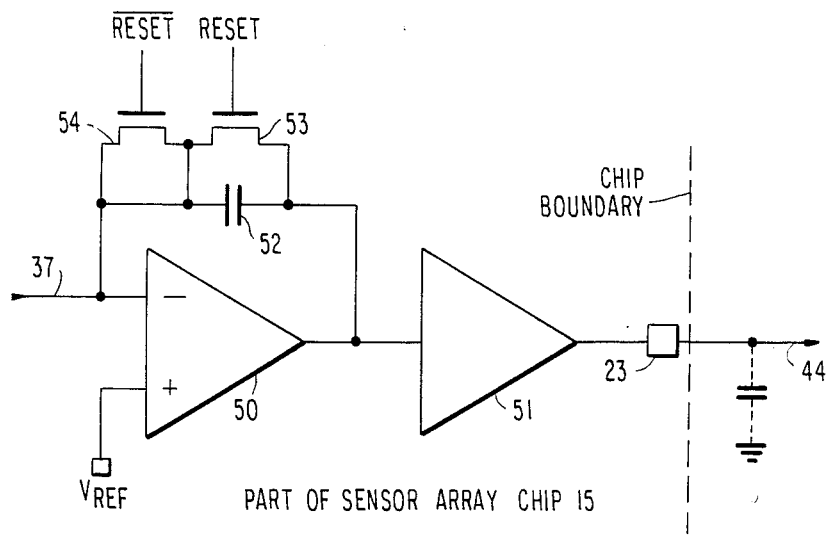
FIG. 3 is a schematic diagram of an improved output signal extracting circuit of the invention.

In accordance with the invention, the above-noted drawbacks of the prior art image sensing device are obviated by disposing of the operational amplifier 41, feedback resistor 42 and fixed-pattern noise integrator 43 utilized in the circuitry of FIG. 1, and adding, on the sensor array chip, an output signal extracting circuit as shown in FIG. 3. In FIG. 3, the inverting input of an operational amplifier 50 is connected to the output line 37. The noniverting input of the operational amplifier 50 receives the reference potential $V_{REF}$. A feedback capacitor 52 is connected directly between the output and the inverting input of the amplifier 50. The capacitance value of the capacitor 52 is preferably in a range of 0.3 to 1 pf. An FET 53 is provided having a channel shunting the capacitor 52. The gate of the FET 53 receives the RESET signal. A second capacitor 54, formed by connecting together the source and drain of an FET, is connected between the inverting input of the amplifier 50 and a source of the RESET signal inverted ($\overline{\text{RESET}}$). In some situations, however, the capacitor 54 and source of the reset signal inverted can be omitted, specifically, if the noise level is sufficiently low. The output of the amplifier 50 is buffered by a buffer amplifier 51, and then applied to the output terminal pad 23. The output terminal pad 23 is connected directly via the output line 44 to the external processing circuitry.

In operation, the scanning of the pixel array 12 by the vertical shift register 11 and the sequential coupling of the outputs from the pixel array 12 to the output line 37 by operation of the horizontal shift register 13 takes place in the same manner as described above. Each time that a pulse is presented to the output signal extracting circuitry of FIG. 3 on the output line 37, the pulse is integrated upon the feedback capacitor 52. The feedback capacitor 52 is reset after each integration period.

It is the purpose of the second capacitor 54 to nominally compensate for the switching transients produced due to the gate-drain capacitance of the FET 53. By feeding to the inverting input of the amplifier 50 the signal $\overline{\text{RESET}}$, the switching transients produced at the transitions of the RESET signal are substantially cancelled.

Figure 4:
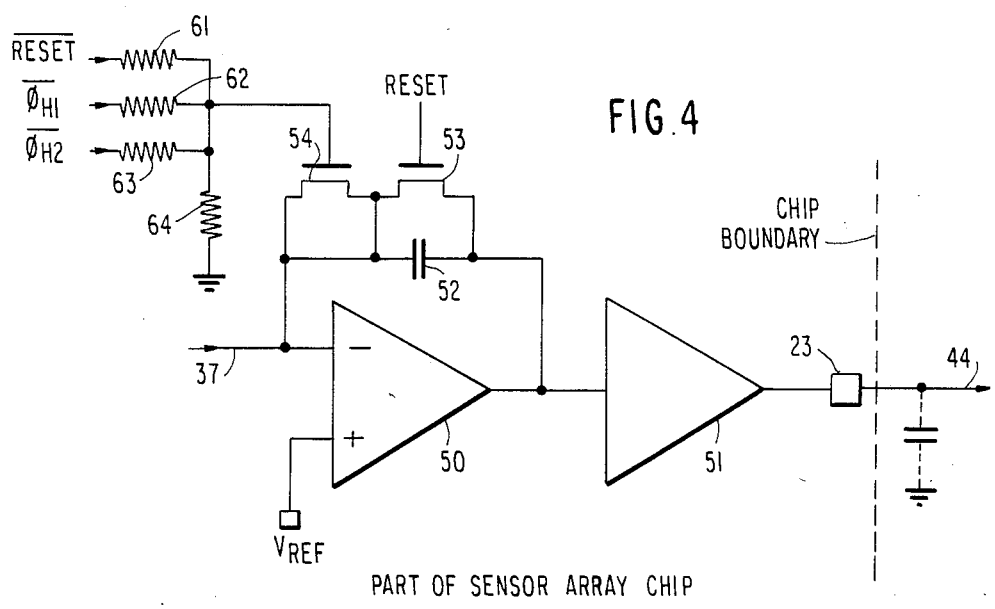
FIG. 4 is a schematic diagram of an alternative embodiment of an output signal extracting circuit of the invention.

If the switching transients on the output line 37 include transients produced, for example, by the clock signals $\phi_{H1}$ and $\phi_{H2}$ utilized by the horizontal shift register 13, the arrangement of FIG. 4 can be utilized. More specifically, the signals which give rise to the unwanted switching transients are summed in a resistive network composed of resistors 61 through 64 and applied to one side of the capacitor 54 for capacitive coupling to the inverting input of the amplifier 50. Although the signals $\overline{\text{RESET}}$, $\phi_{H1}$ and $\phi_{H2}$ are indicated in the embodiment of FIG. 4, any signal which gives rise to an unwanted transient component can be utilized. The values of the resistors of the network should, of course, be adjusted in accordance with the relative magnitudes of the various transient components.

The invention provides the following advantages: The stray capacitance on the output terminal of the image sensing device is drastically reduced. Secondly, the integrator amplifier need not have such a high gain-bandwidth product because the integration function is performed directly. Hence, the amplifiers 50 and 51 can be readily implemented with standard integrated circuit techniques. Their gain-bandwidth product need only be so high as to allow settling to occur before the next reset pulse. Also, the amplifier 50 may actually clip or distort the signal without causing cumulative errors. No active external amplifier connection is required to the amplifier 50, thereby permitting the use of a small integrating capacitor and simple amplifier design. Finally, the gain-bandwidth product of the output buffer amplifier 51 need only be about 5 to 10 MHz when driving the external stray capacitance since it serves only as a buffer amplifier. That is, the amplifier 51 need not provide any actual signal gain and must only be capable of accurately following its input signal.

This completes the description of the preferred embodiments of the invention. Although preferred embodiments have been described, it is believed that numerous modifications and alterations thereto would be apparent to one of ordinary skill in the art without departing from the spirit and scope of the invention.

I claim:

1. An image sensing device on a semiconductor chip comprising:
   a chip output terminal;
   an array of photosensing elements;
   means responsive to clocking signals for sequentially coupling outputs of said photosensing elements to an array output terminal, said array output terminal having fixed-pattern noise thereon due to switching transients and induced noise;
   means for removing said fixed-pattern noise by integration of the output on said array output terminal over a period corresponding to the period of said clocking signals; and
   buffer means, connected between said removing means and said chip output terminal means, for isolating said chip output terminal from said removing means and from said array output terminal,
   wherein said removing means comprises an operational amplifier integrator having an inverting input coupled to said array output terminal, a first capacitor coupled between an output of said operational amplifier and said inverting input, an FET transistor having a channel coupled in parallel with said first capacitor and a gate coupled to a source of a reset signal.

2. The image sensing device of claim 1, further comprising a second capacitor coupled between said inverting input and a source of a signal having a waveshape similar to and a polarity opposite from a non-information-bearing component of a signal on said array output terminal.

3. The image sensing device of claim 1, wherein a noninverting input of said amplifier is coupled to a reference potential terminal.

4. The image sensing device of claim 1, wherein said buffer means is a buffer amplifier having a gain-bandwidth product of about 5 to 10 MHz.

5. The image sensing device of claim 2, wherein said source of said signal having a waveshape similar to and a polarity opposite from a non-information-bearing component of said signal on said array output terminal comprises a source of said reset signal inverted.

6. The image sensing device of claim 2, wherein said source of said signal having a waveshape similar to and a polarity opposite from a non-information-bearing component of said signal on said array output terminal comprises a resistive summing network receiving as inputs a source of said reset signal inverted and said clocking signals inverted.

* * * * *